United States Patent [19]

Morita et al.

[11] Patent Number: 5,014,297

[45] Date of Patent: May 7, 1991

[54] TELEPHONE ANSWERING DEVICE WITH AUTOMATIC RETURN TO INCOMING MESSAGE MODE

[75] Inventors: Akio Morita; Yoshitomo Nakano, both of Tokyo, Japan

[73] Assignee: Sony Corporation, Tokyo, Japan

[21] Appl. No.: 809,776

[22] Filed: Dec. 17, 1985

[30] Foreign Application Priority Data

Dec. 28, 1984 [JP] Japan ................. 59-279323

[51] Int. Cl.$^5$ ................. H04M 1/64; G11B 15/52
[52] U.S. Cl. ................. 379/82; 360/72.2; 379/77
[58] Field of Search .......... 179/6.03, 6.07, 6.11, 179/6.13; 360/72.2

[56] References Cited

U.S. PATENT DOCUMENTS

| | | | |
|---|---|---|---|
| 3,991,274 | 11/1976 | Darwood .................. | 179/6.11 |
| 4,420,785 | 7/1980 | Huber et al. ............. | 360/72.2 |
| 4,421,954 | 12/1983 | Mita et al. .............. | 179/6.13 |
| 4,436,959 | 3/1984 | Nakatsuyama et al. ....... | 179/6.07 |
| 4,596,901 | 6/1986 | Hanslom et al. ........... | 179/6.11 |

OTHER PUBLICATIONS

Code-A-Phone ® Telephone Answering System Model 2530 with Total Remote Command Installation and Operating Booklet, ©1983, pp. 1–27.

Primary Examiner—Stuart S. Levy
Assistant Examiner—Joseph A. Rhoa
Attorney, Agent, or Firm—Lewis H. Eslinger

[57] ABSTRACT

In an auto telephone answering apparatus for playing back an outgoing message recorded on a magnetic tape and sending the outgoing message to a calling party and for recording an incoming message from the calling party on the magnetic tape, an auto answer mode is set for automatically connecting telephone lines to the auto telephone answering apparatus upon detection of an incoming call from the calling party, playing the outgoing message recorded on the magnetic tape, and setting an incoming call wait state for recording the incoming message from the calling party on the magnetic tape after playback of the outgoing message, an end of playback of the incoming message or messages recorded on the magnetic tape is detected in a playback mode and results in an incoming message end signal, and a control causes establishment of the auto answer setting mode in response to the incoming message-end signal.

3 Claims, 7 Drawing Sheets

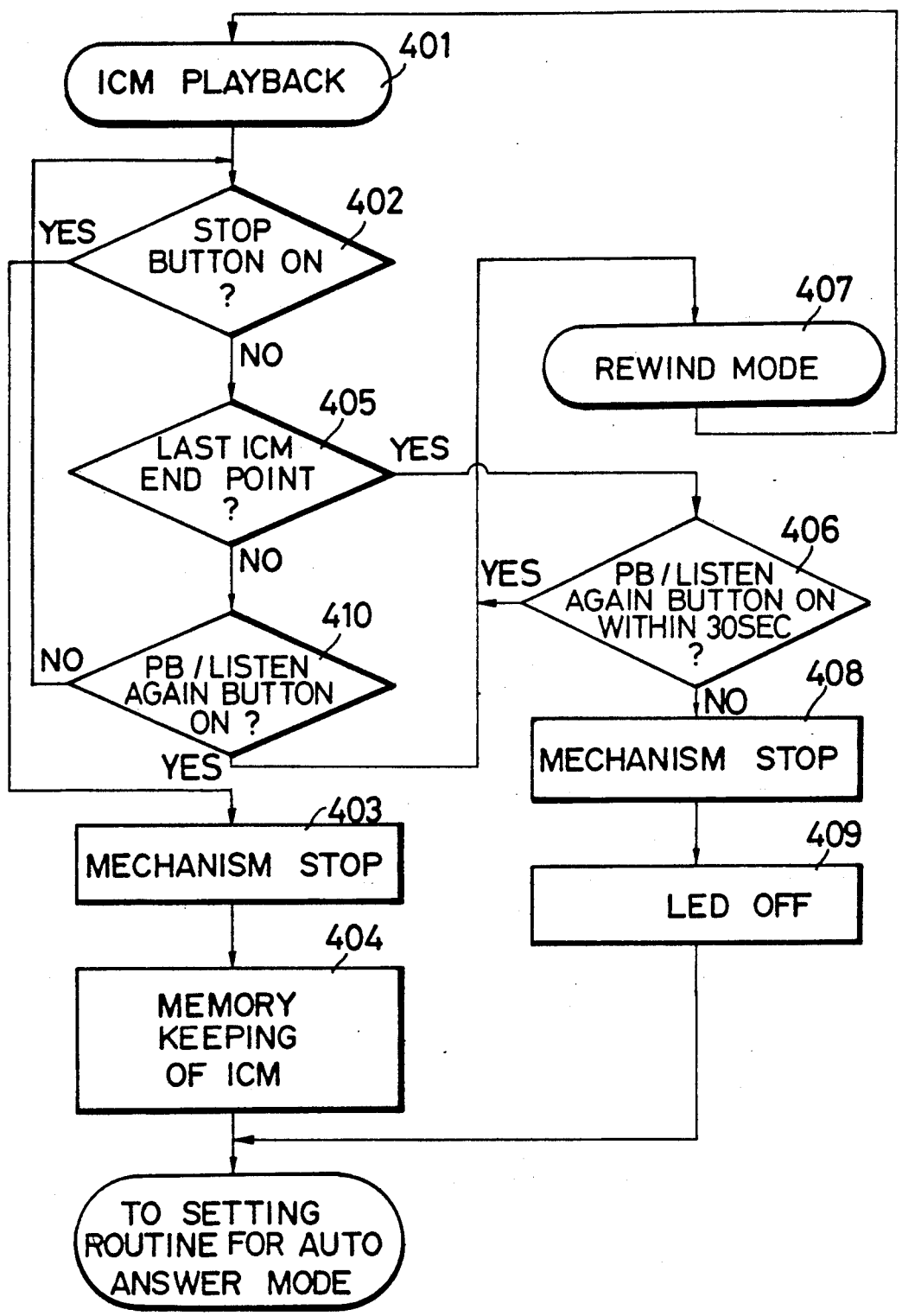

TELEPHONE ANSWERING DEVICE WITH AUTOMATIC RETURN TO INCOMING MESSAGE MODE

BACKGROUND OF THE INVENTION

1. Field of the Invention

The present invention relates to an auto telephone answering apparatus for recording an incoming message (to be referred to as an ICM hereinafter) while the called telephone is unattended.

2. Description of the Prior Art

In a conventional auto telephone answering apparatus, a recorded outgoing message (to be referred to as an OGM hereinafter) stating that the called party is out and that an ICM will be recorded is played back and sent to the calling party upon reception of a call, and an ICM is then recorded. A conventional auto telephone answering apparatus of this type has a selector switch for selecting an auto answer mode or a listen mode. When a user or subscriber is leaving the phone unattended, the selector switch is set in the auto answer mode.

For example, U.S. Pat. No. 4,421,954 describes an auto telephone answering apparatus using a 1MD (One Mechanical Deck) system in which a single tape can sequentially record an OGM and a plurality of ICMs. When the auto telephone answering apparatus is being set in the auto answer mode, an OGM is first played to make certain that the OGM is properly recorded in a predetermined tape format. After the OGM is played, the tape is rewound to the beginning of the OGM and is ready for an incoming call. When the first incoming call is received, the OGM is played and sent to the calling party, and an ICM is recorded on the tape. When recording of the ICM is completed, the tape is rewound to the beginning of the OGM and is ready for the next incoming call. When the second incoming call is received, the OGM is played and sent to the calling party. Then, the tape is fast forwarded to skip the first ICM, and the second ICM is recorded after the first ICM. After the second ICM is recorded, the tape is again rewound to the beginning of the OGM and is ready for the next call. The same operation is repeated automatically to sequentially record a plurality of ICMs.

When the recorded ICMs are to be played back, the user sets the switch to select the listen mode and depresses a play button. The ICMs are played sequentially starting from the first recorded ICM.

When the ICMs are being played back, a conventional auto telephone answering apparatus normally goes into a stop mode when all ICMs have been played back or when ICM playback is manually interrupted to permit the user to attend to some other urgent business. If the user again leaves the telephone unattended while the apparatus is in the stop mode, he may forget to set the switch in the auto answer mode, thus resulting in the failure to record subsequently received ICMs.

In another conventional auto telephone answering apparatus, the auto answer mode is cancelled when a tape cassette is inserted or ejected with the apparatus in its auto answer mode.

When a plurality of tapes with different OGMs are prepared and used for different purposes, the user must set the switch to establish the auto answer mode each time he replaces one tape with another, thus inconveniencing the user.

Furthermore, since only the beginning of an OGM need be checked to determine the OGM content, the user often interrupts OGM playback before completion thereof. To do this, the user depresses the stop button or sets the selector switch in the auto answer mode. If the stop button is depressed for that purpose, the selector switch must be thereafter set in the auto answer mode to ensure that incoming messages will be recorded. However, the user often forgets to do this, resulting in the failure to record ICMs.

OBJECTS AND SUMMARY OF THE INVENTION

Accordingly, it is an object of this invention to provide an auto telephone answering machine which is free of the above mentioned disadvantages of conventional apparatus of that type.

More particularly, it is an object of the present invention to provide an auto telephone answering apparatus which is automatically set in an auto answer mode a predetermined time after all ICMs have been played back.

It is another object of the present invention to provide an auto telephone answering apparatus, as aforesaid, which is automatically set in an auto answer mode a predetermined time after ICM playback has been interrupted.

It is still another object of the present invention to provide an auto telephone answering apparatus, as aforesaid, which is automatically set in an auto answer mode a predetermined time after a cassette has been inserted.

It is still another object of the present invention to provide an auto telephone answering apparatus, as aforesaid, which is automatically set in an auto answer mode a predetermined time after OGM playback has been interrupted.

In accordance with an aspect of this invention, an auto telephone answering apparatus for playing an outgoing message recorded on a magnetic tape and sending the outgoing message to a calling party and for recording an incoming message from the calling party on said magnetic tape, is provided with magnetic head means for recording a signal on said magnetic tape in a record mode and reproducing a signal from said magnetic tape in a playback mode; tape driving means operative in said record and playback modes for driving said magnetic tape relative to said magnetic head means and inoperative in a stop mode; means for selectively establishing said record, playback and stop modes of the apparatus; auto answer setting means for automatically connecting telephone lines to the auto telephone answering apparatus upon detection of an incoming call from a calling party, establishing said playback mode for playing back the outgoing message recorded on said magnetic tape, and then setting an incoming call wait state in which said record mode is established for recording an incoming message from the calling party on said magnetic tape after playback of said outgoing message; detecting means for detecting an end of playback of incoming messages from said magnetic tape in said playback mode and generating an incoming message-end signal; and control means responsive to said incoming message-end signal from the detecting means for rendering operative said auto answer setting means.

Further, it is a feature of this invention to provide an auto telephone answering apparatus, as aforesaid, in which the control means for rendering operative the auto answer setting means is also responsive to loading of a magnetic tape cassette into an operative position in the apparatus, to interruption of the playback of the recorded outgoing message, or to interruption of the playback of a recorded incoming message.

The above, and other objects, features and advantages of this invention, will be apparent in the following detailed description of a preferred embodiment which is to be read in connection with the accompanying drawings wherein like parts are identified by the same reference numerals in the several views.

BRIEF DESCRIPTION OF THE DRAWINGS

FIGS. 4 through 7 are flow charts to which reference will be made in explaining the operation of the auto telephone answering apparatus of FIGS. 2 and 3.

DETAILED DESCRIPTION OF THE PREFERRED EMBODIMENT

Figure 2:
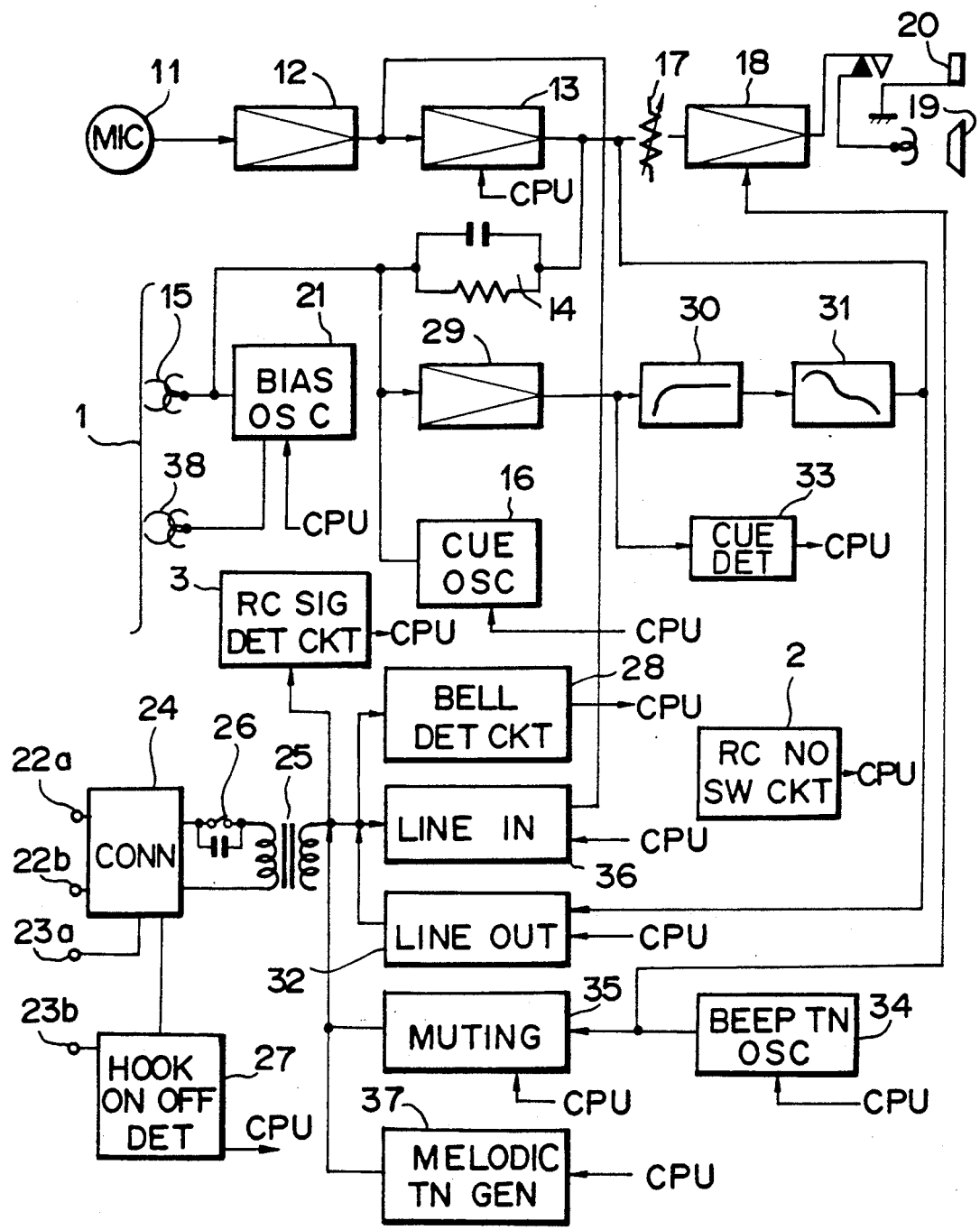
FIGS. 2 and 3 are block diagrams which together illustrate the auto telephone answering apparatus embodying the inventions.
Figure 3:
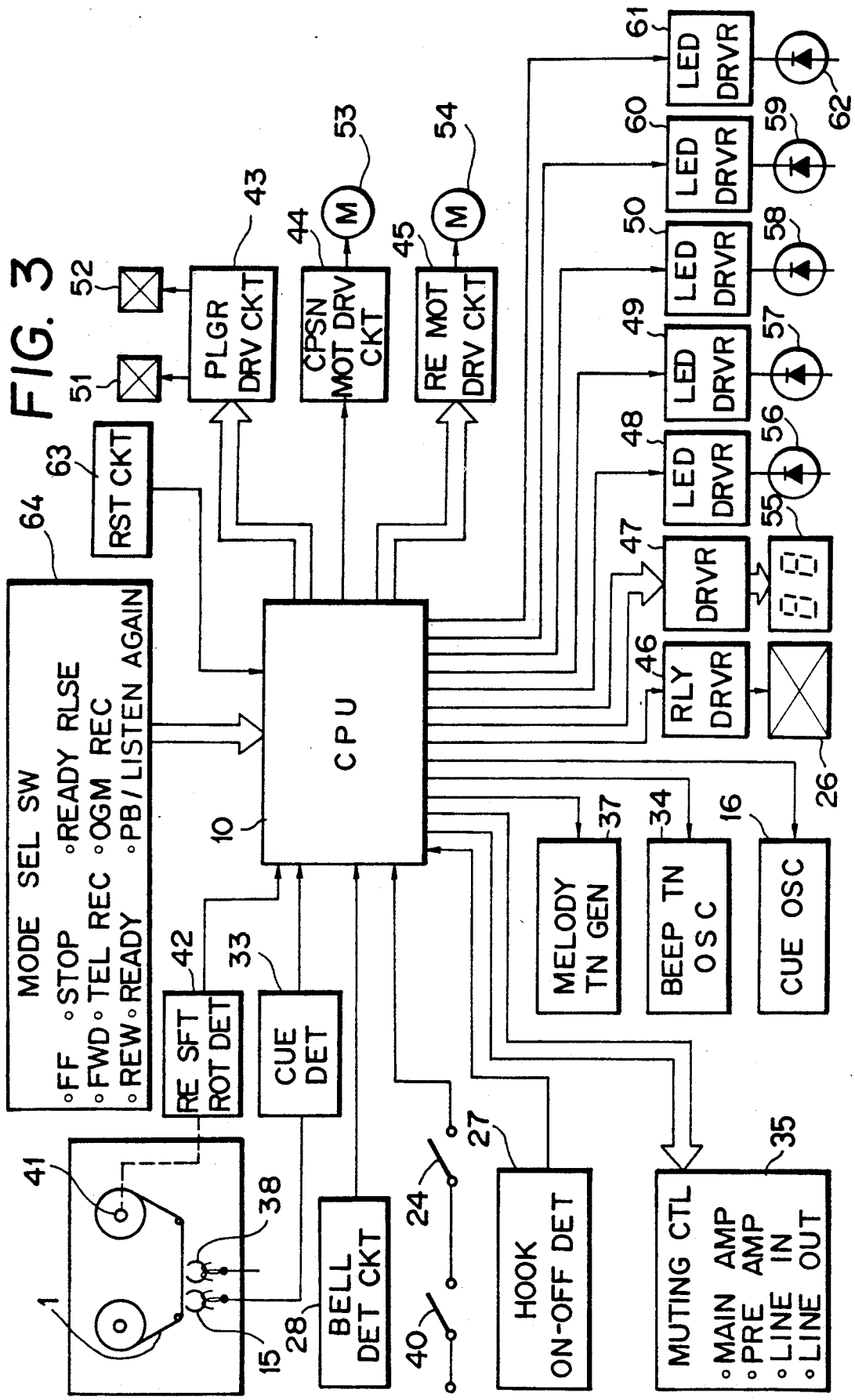

Referring to the drawings in detail, and initially to FIGS. 2 and 3 thereof, it will be noted that FIG. 2 generally shows an input/output circuit and recording circuit of an auto telephone answering apparatus according to an embodiment of this invention and which are connected to a telephone set, while FIG. 3 shows a peripheral circuit system associated with a CPU 10 of a microcomputer by which all operations of the apparatus are automatically controlled.

As shown on FIG. 2, when an OGM is being recorded on a tape 1, an OGM signal from a microphone 11 is supplied to a record/playback head 15 through a microphone amplifier 12, a record amplifier 13 under the control of CPU 10 and an equalizer 14, so that the OGM signal is recorded by head 15 on tape 1. At the same time, a cue signal from a cue signal oscillator 16 under the control of CPU 10 is supplied to record/playback head 15 for recording on tape 1. The cue signal oscillator is also operated under the control of CPU 10 at a predetermined time during ICM recording. The OGM signal is supplied to a loudspeaker 19 through a potentiometer 17 and a main amplifier 18 and thus may be monitored. When earphones are used, an earphone plug (not shown) is inserted in an earphone jack 20. A bias oscillator 21 is operated under the control of CPU 10 to supply a bias current to record/playback head 15, and at the same time, to supply an erasure current from oscillator 21 to an erase head 38. A beep tone signal is supplied by a beep tone oscillator 34 to record/playback head 15 through a muting circuit 35, a line input circuit 36, record amplifier 13, and equalizer 14, and is thereby recorded on tape 1 under the control of CPU 10 over amplifier 13, oscillator 34, muting circuit 35 and line input circuit 36.

A connector 24 is connected to terminals 22a and 22b of a telephone set and terminals 23a and 23b of a main wire. A line transformer 25 is connected to connector 24 through a DC loop relay 26 which, as hereinafter shown, is energized under the control of CPU 10. An on-/off-hook detector 27 is connected to terminal 23b to detect whether the receiver is on or off the hook and the detection output thereof is applied to CPU 10. When an incoming call is received, that is, when a ringing signal is supplied to terminals 22a and 22b, the ringing signal is detected by a bell or ringing signal detector 28 through line transformer 25. After the bell rings twice, that is, after two ringing signals, a detection signal is supplied from detector 28 to CPU 10 which causes relay 26 to be energized to form a DC loop.

During reproducing or playback of the OGM recorded on tape 1 together with a cue signal, the reproduced signal is supplied from head 15 through a preamplifier 29 to a high-pass filter 30 which eliminates the cue signal. The reproduced OGM is then sent through an equalizer 31 to loudspeaker 19 through amplifier 18, and at the same time, is sent through a line output circuit 32 under the control of CPU 10 to the calling party by way of line transformer 25 and the telephone lines. The reproduced OGM signal is also supplied from preamplifier 29 to a cue signal detector 33. A cue detection signal from cue signal detector 33 is supplied to CPU 10. When OGM playback is completed, a melodic tone is sent out to line transformer 25 from a melodic tone generator 37 under the control of CPU 10.

For ICM recording, an ICM signal from the calling party is supplied from line transformer 25 to line input circuit 36 under the control of CPU 10. The ICM signal is supplied to head 15 from circuit 36 through record amplifier 13 and equalizer 14 and is recorded by head 15 on tape 1. If the duration of the ICM exceeds 60 seconds, a beep tone is generated by oscillator 34 under the control of CPU 10 and the latter also automatically interrupts recording. Mute and beep tone portions are formed on the tape by operating erase head 38 and beep tone oscillator 34, respectively, at times determined by CPU 10.

The auto telephone answering apparatus according to the invention can also be remote controlled. In this case, a remote controller number is supplied from a remote control number switch circuit 2 to CPU 10. The remote control signal sent from the remote controller through the telephone lines is detected by a remote control signal detector 3.

Referring to FIG. 3, it will be seen that CPU 10 receives a +B power source voltage when a switch 40, which detects the presence of a tape cassette with its recording safety tab in tact, and the connector 24 are both ON. A reel shaft rotation detector 42 detects the halt in the rotation of a reel shaft 41 when the tape 1 is rewound to a tape top point $N_0$. The detector 42 also detects the number of reel revolutions when the tape is driven from the tape top point $N_0$. The CPU 10 also receives command signals from a mode selection switch assembly 64 in addition to command signals from remote control number switch circuit 2, remote control signal detecting circuit 3, hook on/off detector 27, bell or ringing signal detector 28 and cue detector 33. The CPU 10 is further shown to control a plunger or solenoid driver or energizing circuit 43 for operating a solenoid 51 for effecting forward drive of the tape, for example, by pressing a pinch roller (not shown) against a rotated capstan with the tape therebetween, and also for operating a cue signal plunger or solenoid 52. Also controlled by CPU 10 are a drive circuit 44 for a capstan motor 53, a drive circuit 45 for a motor 54 which drives reels on which the tape is wound, an energizing circuit or driver 46 for relay 26, a display driver or energizing circuit for a display device 55 which, for example, can display a recording number, and LED drivers 48, 49, 50, 60 and 61 for energizing LEDs 56,57,58,59 and 62 by which various operating states of the apparatus are visually indicated. Finally, a reset circuit 63 is provided for resetting CPU 10 after each application of power to the apparatus.

Figure 1:
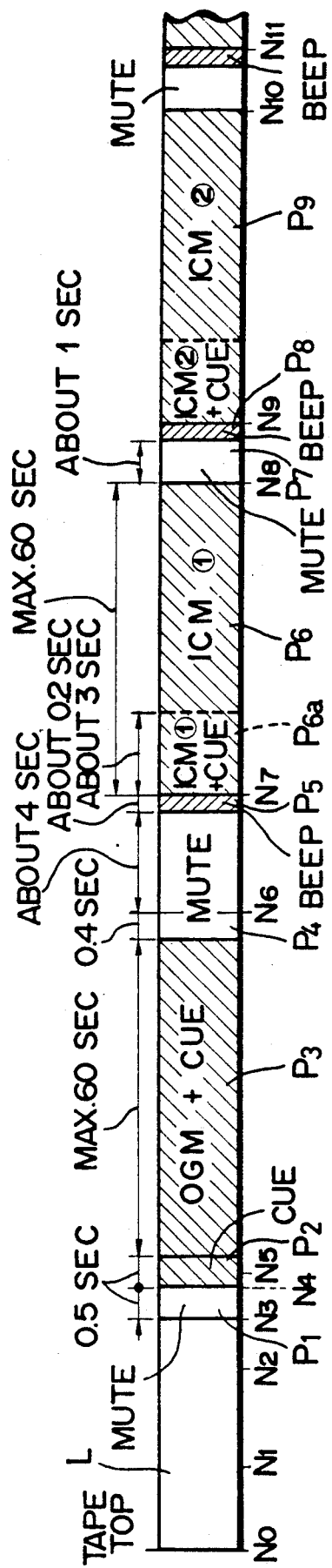
FIG. 1 is a diagrammatic view illustrating a data format on a tape recorded in an auto telephone answering apparatus according to an embodiment of the present invention.

Referring now to FIG. 1 which shows a format of a magnetic tape 1 on which an OGM and a plurality of ICMs have been recorded, it will be seen that detection of the start points of the OGM and of the ICMs and other necessary tape position detection is effected in an auto telephone answering apparatus according to the present invention by detecting numbers of reel revolutions by means of detector 42, and by comparing the detected values with reel revolution number data previously stored in CPU 10. Reference symbols $N_0$, $N_1$ and $N_2$ in the following description and the drawings denote tape positions defined by respective reel revolution numbers.

As shown on FIG. 1, a 0.5-sec. mute portion $P_1$ and a 0.5-sec. cue portion $P_2$ are formed in succession beginning at point $N_3$ after the leader tape L. An OGM of up to 60 seconds is recorded together with a cue signal, for example, having a frequency of 30 Hz. in a portion $P_3$ of the tape. A 4-sec. mute portion and a 0.2-sec. beep tone (as a separation mark) are recorded in portions $P_4$ and $P_5$, respectively, of the tape after the OGM. Subsequently, a first ICM (1) of up to 60 seconds is recorded in a tape portion $P_6$ from a point $N_7$ to a point $N_8$. In the embodiment herein described, the first ICM (1) is initially recorded together with a cue signal, for example, having a frequency of 30 Hz, for the first three seconds, as at $P_{6a}$. A one-second mute portion $P_7$ and a 0.2-sec. beep tone portion $P_8$ are recorded in sequence after the first ICM (1) in portion $P_6$, and then a second ICM (2) is recorded in a portion $P_9$ from a point $N_9$. In the same manner, a third and subsequent ICMs up to at least 20 ICMs are recorded, and each ICM is separated, by a mute portion and a beep tone portion, as at $P_7$ and $P_8$, from the preceding recorded ICM.

The sequential operating steps of the auto telephone answering apparatus according to this invention will now be described:

For OGM Recording (1) The user inserts a cassette in the apparatus and depresses an OGM record button of mode selection switch assembly 64. The OGM record mode is thus set, and LED 56 arranged near the OGM record button is turned ON or energized continuously.

(2) CPU 10 causes tape 1 to be rewound to a tape top position $N_0$ and then fast forwarded to the point $N_3$ (FIG. 1).

(3) The tape portion $P_1$ between the points $N_3$ and $N_4$ is erased by head 38 while the tape is driven in the forward direction for about 0.5 seconds or more. This is enough to ensure that the leader tape portion is passed and also to erase any previously recorded signals on the immediately adjacent part of the tape.

(4) A 0.5-sec. cue signal is recorded in portion $P_2$ extending from the point $N_4$ and CPU 10 sets the apparatus in its pause state, thereby completing the ready operation. At this point, the LED 56 changes from continuous illumination to slow flashing, and a beep tone is produced by oscillator 34 and loudspeaker 19 for about one second, signaling to the user that preparation of the cassette for OGM recording has been completed.

(5) When the user thus ascertains that preparation is complete, he again depresses the OGM record button.

(6) The pause mode is thereby cancelled, and the OGM record mode is set. The user records an OGM by means of microphone 11, and LED 56 changes from flashing to continuous illumination, thus indicating that an OGM is being recorded. At the same time, second LED 57 flashes or varies in intensity in accordance with the voice level from microphone 11. It should be noted that CPU 10 changes the pause mode to the stop mode if the pause mode continues for more than about 30 seconds. In this case, third LED 58 flashes rapidly.

(7) During OGM recording, a cue signal from oscillator 16 is recorded together with the speech signal in portion $P_3$. OGM recording lasts up to 60 seconds. If the user depresses the OGM record button again within 60 seconds, OGM recording is interrupted. After such interruption of OGM recording, the tape is erased by head 38 while the tape is driven in the forward direction for about 4 seconds to form mute portion $P_4$ and then the tape is stopped. It should be noted that a beep tone audible to the user is produced during the 4-second erasure period.

(8) When about 5 seconds have elapsed after the beep tone has stopped and OGM recording has been completed, CPU 10 causes the apparatus to be automatically set in the auto answer mode. In this case, fourth LED 59 is turned ON to indicate that fact.

OGM playback for checking whether the OGM has been recorded in the predetermined OGM format (9) The tape 1 is rewound and is stopped at the predetermined proper position $N_2$ between the points $N_0$ and $N_3$ (FIG. 1).

(10) The tape is then driven in the forward direction to the point $N_3$, and it is made certain that there is a 0.5-sec. mute portion $P_1$ between the points $N_3$ and $N_4$. If a recorded portion of 1 second or longer is detected, this is identified as an OGM format error and, in response thereto, the apparatus is set in the stop mode and the third LED 58 flashes rapidly.

(11) If the mute portion $P_1$ continues for 7 seconds or more, this is also detected as an OGM format error leading to establishment of the stop mode and rapid flashing of LED 58.

(12) When the cue signal portion $P_2$ after point $N_4$ is detected, the operation of loudspeaker 19 is enabled and it is made certain that there is at least one second of recorded information (the speech signal plus the cue signal) in the portion $P_3$ following the cue signal alone. If a mute portion is detected in portion $P_3$ and continues for 0.3 seconds or more, this is identified as an OGM format error.

(13) When continuation of portion $P_3$ (the speech signal plus the cue signal) beyond one second is detected, OGM playback continues. If a 0.4-sec. mute portion is detected after OGM playback of portion $P_3$ is completed, the tape is stopped at position $N_6$. At the same time, loudspeaker output is disabled. The stop position $N_6$ is stored in CPU 10 as an OGM end, and OGM test playback is completed. If OGM playback of portion $P_3$ continues for 70 seconds or more, this is also detected as an OGM format error.

(14) When OGM test playback is completed, the tape is rewound to the predetermined point $N_1$ and is then fast forwarded to the point $N_3$. Finally, the tape is forwarded to the point $N_4$.

(15) The tape is forwarded from the point $N_4$ to the point $N_5$, during which movement a 0.2-sec. cue signal is detected. The point $N_5$ is stored as the beginning of an OGM.

Reception of Incoming Calls

The apparatus is thus set in the auto answer mode or ready state for receiving an incoming call.

(16) When the first incoming call is received with the apparatus in the auto answer mode or ready state, for example, when circuit 28 detects the bell ringing twice, DC loop relay 26 is energized by driver 46 to connect the apparatus with the telephone lines. The tape 1 is then played back, and the OGM is reproduced and sent to the calling party through the telephone lines.

(17) When the 0.4-sec. mute portion is not detected within 2 seconds after the OGM end $N_6$, or when the OGM end $N_6$ is not detected within 2 seconds after the 0.4-sec. mute portion is detected, an OGM format error is assumed therefrom. In this case, for example, the apparatus is set in the stop mode and, at the same time, the third LED 58 flashes rapidly. It should be noted that the period of 2 seconds described above is determined in consideration of the period (2 seconds) of the pulse for detecting the reel revolution number. In other words, there is a margin of error of 2 seconds in the detection of the OGM end $N_6$.

(18) When OGM playback is completed as described above, a melodic tone from generator 37 is sent to the calling party and at the same time the portion $P_4$ of the tape is erased while the tape is driven in the forward direction for about 4 seconds.

(19) When the erasure of portion $P_4$ is completed, a 0.8-sec. beep tone is generated by oscillator 34 and is sent to the calling party. The last 0.2-second portion of the beep tone is also recorded in portion $P_5$ as the separation mark on the tape 1.

(20) ICM recording in tape portion $P_6$ is started after the beep tone is sent to the calling party.

(21) ICM recording lasts a maximum of 60 seconds. Within that 60 second period, an ICM record end at $N_8$ is determined by detecting a continuous speech signal, a mute signal, a click noise generated upon on-hook operation, or a busy signal.

(22) When ICM recording is completed, the end point $N_8$ is stored in CPU 10, and a beep tone is sent from oscillator 34 to the calling party for about 4 seconds to signal the end of recording.

(23) The tape 1 is erased at portion $P_7$ while the beep tone is being sent to the calling party.

(24) After the tape 1 is erased at portion $P_7$, the DC loop relay 26 is de-energized, and the tape 1 is stopped.

(25) The tape is rewound to the point $N_1$ and is subjected to operation step (14) described above. Step (15) is then performed to put the apparatus in the auto answer mode or ready state for the second incoming call.

(26) When the second incoming call is received, the OGM portion $P_3$ is played back up to the point $N_6$ in the same manner as described above.

(27) The tape is fast forwarded past ICM (1) portion $P_6$ to the point $N_8$ while the melodic tone is being sent from generator 37 to the calling party. Forward erasure is performed for one second at portion $P_7$, and, at the same time, the beep tone is sent from oscillator 34 for 0.8 seconds. Thus, the apparatus is in the state thereof at the conclusion of operation step (20). The second ICM (2) can then be recorded in tape portion $P_9$ in the same manner as described above.

It will be appreciated that the CPU 10 stores values of ICM end points $N_8, N_{10}, \ldots$ from detector 42 each time ICM recording is performed. When the tape is fast forwarded to the start point of the next ICM recording, the reel revolution number can be detected and compared by CPU 10 with the number of ICMs recorded on the tape to cue the recording start position.

Control signals from CPU 10 are supplied to components of the circuit shown in FIGS. 2 and 3 and CPU 10 receives command signals from certain of those components so as to cause suitably timed operation of the apparatus as noted in steps (1) to (27) above.

In accordance with the present invention, the above-described auto telephone answering apparatus has the following functional features incorporated into the program of its CPU 10:

A. When a predetermined period of time (5 seconds in the embodiment herein described) has elapsed after a cassette has been inserted in the apparatus, the auto answer mode is automatically set.

B. When a predetermined period of time (5 seconds in this embodiment) has elapsed after OGM playback has been interrupted, the auto answer mode is automatically set. For example, when the user wishes to know the content of an OGM, the OGM is played back and playback of the tape is stopped as soon as the user recognizes its content. In such case, the auto answer mode is automatically set.

C. When a predetermined period of time (30 seconds in this embodiment) has elapsed after all recorded ICMs have been played back, the auto answer mode is automatically set. Therefore, the user has 30 seconds to decide whether to protect the recorded ICMs from being erased. If the user chooses to protect the recorded ICMs, the next ICM will be recorded after the last ICM currently on the tape. However, if the recorded ICMs need not be protected, the next ICM is recorded from the beginning of ICM (1) on FIG. 1.

D. When a predetermined period of time (30 seconds in this embodiment) has elapsed after ICM playback has been interrupted, the auto answer mode is automatically set. In such case, the recorded ICMs are normally protected. However, if the user does not wish to protect the recorded ICMs he need not do so.

The above functional features of an automatic telephone answering apparatus according to this invention will be further described with reference to the flow charts of FIGS. 4–7.

Figure 4:
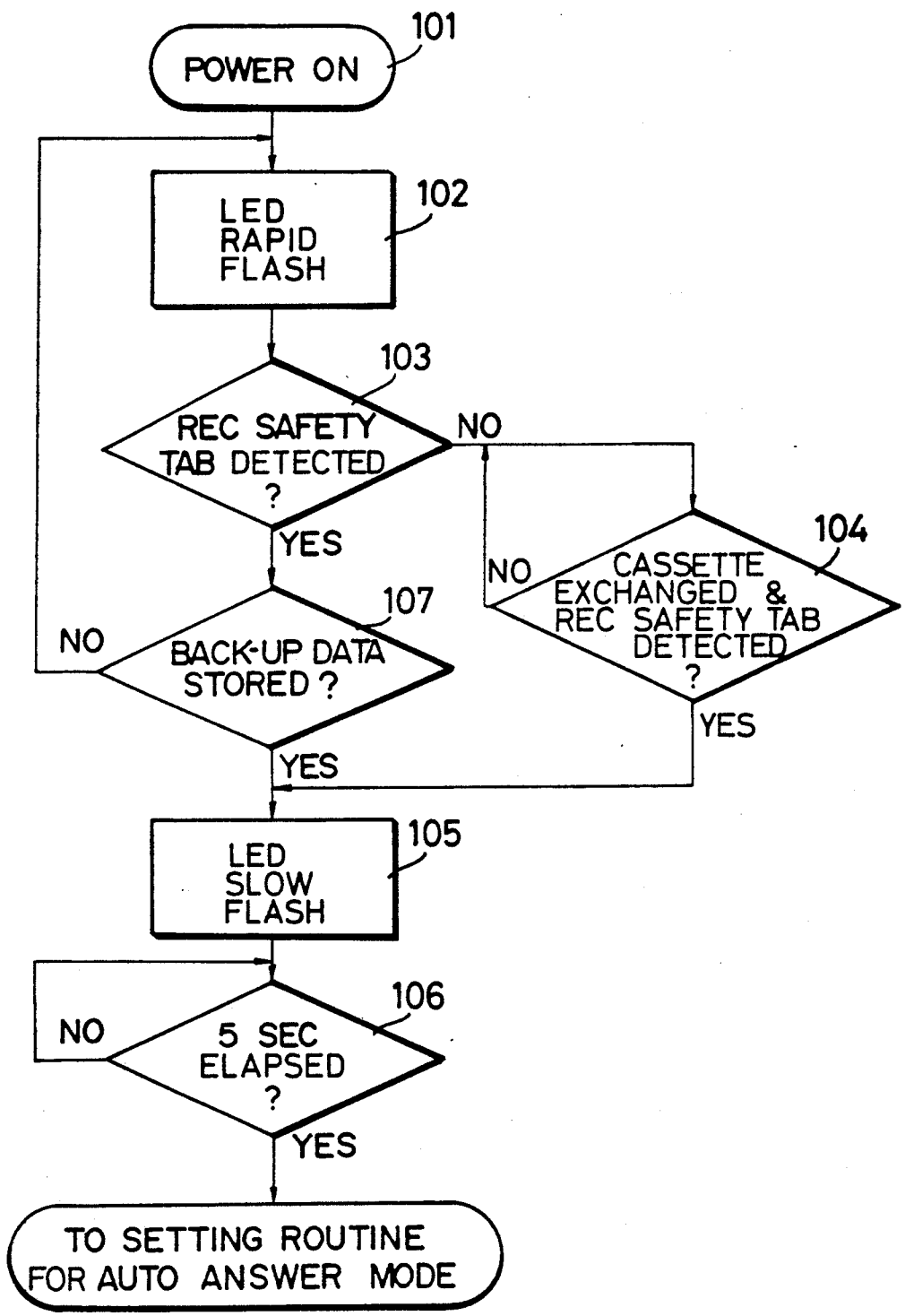

Referring initially to FIG. 4, it will be seen that, in the program routine there illustrated, when power is applied to the apparatus in step 101, LED 62 is made to flash rapidly in step 102 so long as a cassette has not been operatively positioned or inserted in the apparatus. When a cassette is inserted in the apparatus, the presence or absence of the recording safety tab on the cassette housing is detected in step 103, for example, by means of the switch 40. If a recording safety tab is not detected in step 103, it is presumed therefrom that information already recorded on the cassette tape is not to be erased and, therefore, the originally inserted cassette is exchanged or replaced by a new cassette in step 104 which also involves detection of a recording safety tab on the newly inserted cassette. If a recording safety tab is not detected on the new cassette, step 104 is repeated, that is, the cassette is repeatedly exchanged until a cassette with a recording safety tab thereon is detected. When a recording safety tab is detected in step 104, the rapid flashing of LED 62 is changed to the slow flashing thereof in step 105. Thereafter, upon the expiration of a predetermined period of time, for example, 5 seconds, as determined in step 106, the apparatus automatically proceeds to the setting routine for the auto answer mode which will be hereinafter described with reference to FIG. 5.

It will be further noted that, in the routine of FIG. 4, if the existence of a recording safety tab on the operatively positioned cassette is detected in step 103, it is determined whether backup data is stored in step 107. If the existence of backup data in the memory is detected in step 107, the routine proceeds to step 105 in which LED 62 is made to flash slowly and, thereafter, after 5 seconds have elapsed, as determined in step 106, the program automatically proceeds to the setting routine for the auto answer mode. However, if the existence of backup data in the memory is not detected in step 107, rapid flashing of LED 62 will continue and the apparatus does not proceed to the setting routine for the auto answer mode. Thus, when a cassette is loaded into the apparatus upon the restoration of power after a power failure, the apparatus can only proceed to the setting routine for the auto answer mode if backup data was stored in the memory, thereby to prevent inadvertent erasing of ICMs recorded on the tape prior to the power failure due to accidental setting of the auto answer mode.

Upon the completion of the routine illustrated on FIG. 4, OGM test playback is initiated in accordance with a suitable routine (not shown). If the format of the OGM is found to be abnormal, as earlier described, the movement of the tape in the OGM test playback is halted and LED 62 is made to flash rapidly for indicating an OGM error to the user. The foregoing condition continues until the cassette in which an OGM with an abnormal format has been recorded is replaced by a cassette in which an OGM has been properly recorded. So long as the cassette inserted in the apparatus contains an OGM with an improper or abnormal format, no answer will be given by the automatic telephone answering apparatus even when a ringing signal is received. Furthermore, if one of the push-buttons, for example, the playback button, is depressed, a "caution tone" is produced to alert the user to the fact that the inserted cassette has an OGM with an improper format recorded therein. On the other hand, if it is found in the course of the OGM test playback that the OGM format is normal, then the tape is rewound and the cue signal in tape portion $P_2$ at the beginning of the OGM is detected, and the apparatus proceeds to the setting routine for the auto answer mode.

Figure 5:
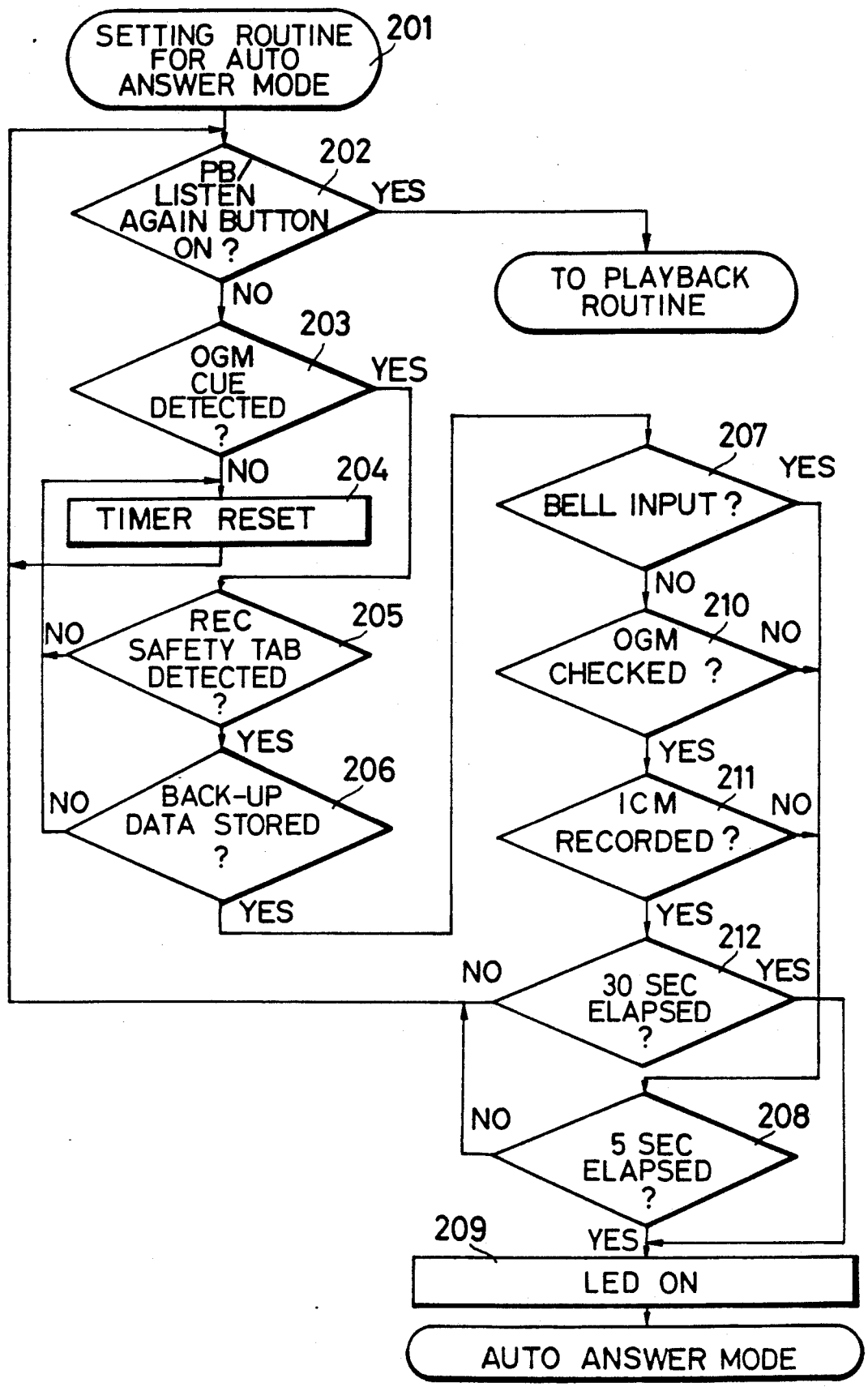

Referring now to FIG. 5, it will be seen that, upon the start 201 of the setting routine for the auto answer mode, it is determined, in step 202, whether a "playback/listen again" push-button of mode selector 64 has been depressed. If it is determined that the "playback/listen again" push-button has been depressed, the apparatus proceeds to a playback routine in which ICMs, if any, recorded on the tape cassette are played back with such ICMs being protected from erasure. Furthermore, if the "playback/listen again" push-button is depressed during ICM playback, then the reproduction or playback of the ICMs is repeated.

If it is determined in step 202 that the "playback/listen again" push-button has not been actuated or depressed, then it is determined in step 203 whether the cue portion $P_2$ at the beginning of the OGM can be detected as an indication that the OGM format is normal and further that the tape is properly positioned. If the OGM cue is not detected in step 203, a timer associated with reel revolution detector 42 for determining the positions along the tape is reset in step 204 and the setting routine is returned to step 202 with one of the LEDs 56-59 being energized to indicate that the apparatus cannot be set in its auto answer mode.

On the other hand, if the OGM cue is detected in step 203, the setting routine for the auto answer mode proceeds to step 205 in which it is determined whether the cassette residing in the apparatus has its recording safety tab thereon. If the recording safety tab is not detected in step 205, thereby indicating that the cassette contains recorded information that is not to be erased, the routine recycles to step 204. However, if a recording safety tab is detected in step 205, then it is confirmed in step 206 that backup data is stored in the memory. If stored backup data is not detected in step 206, the routine returns to step 204. On the other hand, if stored backup data is detected in step 206, it is next determined in step 207 if there is a bell input, that is, if the telephone with which the answering apparatus is associated is then being called. If a bell input is detected in step 207, the routine progresses to step 208 which determines the lapse of 5 seconds and then causes the energizing of LED 58 in step 209. Such energizing of LED 58 in step 209 indicates to the user that the apparatus has attained its auto answer mode, that is, the apparatus is in a ready state for receiving an incoming call.

If no bell input is detected in step 207, then it is determined in step 210 whether there is checking of the OGM, that is, whether there is test playback of the OGM by a suitable routine (not shown). If checking of the OGM is not detected in step 210, the routine proceeds directly to step 208 for establishing the auto answer mode upon the lapse of 5 seconds. However, if step 210 detects OGM checking or test playback, the operation proceeds to a step 211 in which it is determined whether one or more ICMs are recorded. If no ICMs are recorded, the routine proceeds directly to step 208 for establishing the auto answer mode upon the lapse of 5 seconds. However, if step 211 determines that one or more ICMs are recorded, then the lapse of a predetermined longer time, for example, 30 seconds, is determined in step 212 prior to progressing to step 209 for energizing LED 58 and establishing the auto answer mode. The 30 second period of time established in step 212 is selected to provide an adequate opportunity for the user of the apparatus to protect, that is, to prevent erasure, of the ICMs.

Figure 6:
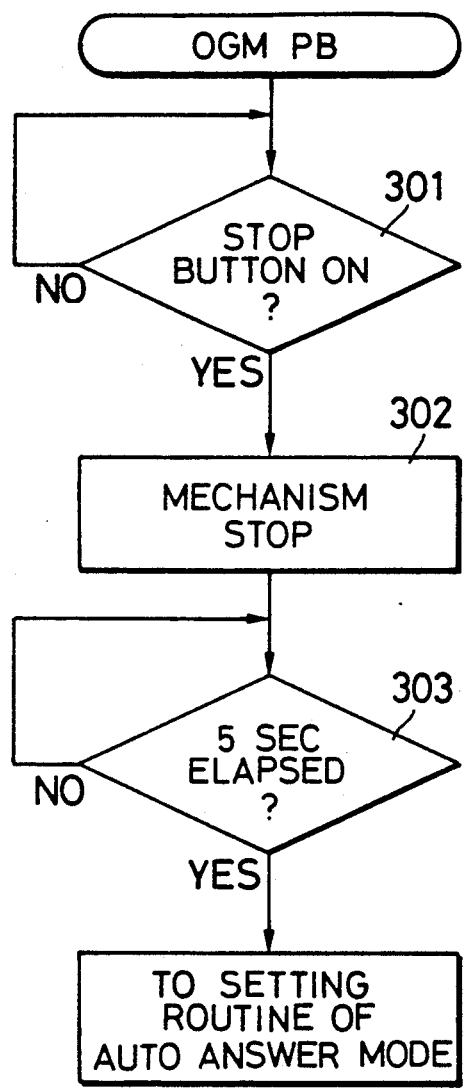

Referring now to FIG. 6 which illustrates a program routine for OGM playback, it will be seen that, if during such playback the "stop" push-button of mode selector 64 is depressed, such actuation of the "stop" push-button is detected in step 301 and, in response thereto, a mechanism for stopping the OGM playback is made operative in step 302. Thereafter, in step 303, the lapse of 5 seconds is determined prior to proceeding to the setting routine for the auto answer mode previously described with reference to FIG. 5.

During ICM playback, CPU 10 constantly monitors the end positions of all ICMs by means of the reel revolution numbers $N_8, N_{10}$, etc., and the respective cue signals. When the tape reaches the end of the last ICM recorded thereon, CPU 10 generates a mechanical stop signal to halt the forward driving of the tape. If the user depresses the "playback/listen again" push-button while the apparatus is thus in its stop mode, the tape is rewound and may be played back from a position corresponding to the moment when the user released the "playback/listen again" push-button. If the user does not actuate any of the push-buttons of mode selector 64 after ICM playback is halted, the apparatus automatically proceeds to the setting routine for the auto answer mode described with reference to FIG. 5. Since, in this case, one or more ICMs are recorded on the tape, this fact is detected in step 211 on FIG. 5 with the result that the auto answer mode is established only after the lapse of 30 seconds, as provided in step 212, for ensuring that the user has an opportunity to protect the recorded ICMs. When the cue signal at the beginning of the OGM is detected, the apparatus is in its ready state for the next incoming call. When an incoming call is received and circuit 28 detects two rings, the OGM is played back or reproduced and transmitted to the calling party and, thereafter, a new ICM is recorded either from the starting portion of the ICM (1), in the case where the previous ICMs are not protected, or after the last of the previously recorded ICMs, in the case where such previously recorded ICMs are protected.

Referring now to FIG. 7 which shows a program routine for ICM playback in accordance with this invention, it will be seen that after the ICM playback is initiated in step 401, the actuation of the "stop" push-button of mode selector 64 for halting the ICM playback before the end of the last recorded ICM is detected in step 402. In response to such detection of the actuation of the "stop" push-button, the tape drive mechanism of the apparatus is halted in step 403 and, thereafter, the maintenance in the memory of data concerning the ICMs, for example, the numbers $N_7$-$N_{11}$, is ensured in step 404 before returning to the setting routine for the auto answer mode.

If actuation of the "stop" push-button is not detected in step 402, the routine proceeds to step 405 which detects the end point, for example, that indicated at $N_{10}$ on FIG. 1, of the last recorded ICM. When the last ICM end point is detected in step 405, the routine proceeds to step 406 which determines whether the "playback/listen again" push-button is actuated within 30 seconds following the completion of the playback of the last ICM. If the "playback/listen again" push-button is actuated within that period of 30 seconds, the apparatus is changed-over to its rewind mode in step 407 and, at the completion of the rewinding of the tape, the ICM playback is again initiated in step 401. On the other hand, if actuation of the "playback/listen again" push-button within 30 seconds is not detected in step 406, then the drive mechanism for the tape is stopped in step 408 and the LED 59 which was energized during ICM playback is de-energized or turned off immediately prior to the return of the apparatus to the setting routine for the auto answer mode, described with reference to FIG. 5.

Finally, with reference to the routine of FIG. 7, when the last ICM end point has not been detected in step 405, the actuation of the "playback/listen again" push-button during the ICM playback is detected in step 410 and again initiates the rewind mode in step 407 as a prelude to the repetition of the ICM playback.

By way of summary, it will be understood that, in the above-described auto telephone answering apparatus according to this invention, the auto answer mode is automatically set predetermined times after a cassette has been inserted in the apparatus, after OGM playback has been interrupted, after all recorded ICMs have been played back, and after ICM playback has been interrupted. By reason of the foregoing, the setting of the apparatus in its auto answer mode is assured for avoiding the inadvertent failure to record incoming calls.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope of spirit of the invention as defined in the appended claims.

What is claimed is:

1. An auto telephone answering apparatus for playing an outgoing message recorded on a magnetic tape and sending the outgoing message to a calling party and for recording an incoming message from the calling party on said magnetic tape, comprising:
   cassette loading detecting means for detecting that a cassette housing said magnetic tape is loaded in an operative position in the apparatus and providing an output in response thereto;
   magnetic head means having a record mode and a playback mode for recording a signal on, and reproducing a signal from said magnetic tape in said operative position;
   tape driving means operative in said record and playback modes for driving said magnetic tape in a forward direction, and in a rewind mode for driving the tape in a reverse direction, and being inoperative in a stop mode;
   switch means for selectively establishing said record, playback, rewind and stop modes of the apparatus;
   auto answer setting means being selectively operative for automatically and successively connecting telephone lines to said auto telephone answering apparatus upon detection of an incoming call from a calling party, establishing said rewind mode for returning the tape to a position near the beginning of said outgoing message followed by the establishment of said playback mode independently of said switch means for reproducing the outgoing message recorded on said magnetic tape, and sending the same to the calling party, and then setting an incoming call wait state in which said record mode is established for recording an incoming message from the calling party on said magnetic tape at a position after said outgoing message;
   means for effecting playback of each said incoming message recorded on said magnetic tape;
   end of playback detecting means for detecting an end of said playback of incoming messages from said magnetic tape and automatically generating an incoming message-end signal upon detecting said end of playback of incoming messages; and
   control means which selectively renders said auto answer setting means operative in response to said output from said cassette loading detecting means and in response to said incoming message-end signal from said end of playback detecting means.

2. An auto telephone answering apparatus according to claim 1; wherein said control means includes means for determining lapse of a predetermined period of time, whereby said control means renders operative said auto answer setting means in response to said output from the cassette loading detecting means only after said predetermined period of time elapses following reception of said output from the cassette loading detecting means.

3. An auto telephone answering apparatus according to claim 1; wherein said cassette loading detecting means detects a recording safety tab on a loaded cassette and generates a recording safety tab detection signal in response to the presence of such tab.

* * * * *